(12) United States Patent
Hasegawa et al.

(10) Patent No.: US 11,372,560 B2
(45) Date of Patent: Jun. 28, 2022

(54) UTILIZATION-EFFICIENT RESOURCE ALLOCATION

(71) Applicant: Kioxia Corporation, Tokyo (JP)

(72) Inventors: Yohei Hasegawa, Fuchu Tokyo (JP); Takeshi Ishihara, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/007,600

(22) Filed: Aug. 31, 2020

(65) Prior Publication Data

US 2021/0271400 A1 Sep. 2, 2021

(30) Foreign Application Priority Data

Feb. 27, 2020 (JP) .............................. JP2020-031667

(51) Int. Cl.
*G06F 3/06* (2006.01)
(52) U.S. Cl.
CPC .......... *G06F 3/0631* (2013.01); *G06F 3/0604* (2013.01); *G06F 3/0616* (2013.01); *G06F 3/0653* (2013.01); *G06F 3/0665* (2013.01); *G06F 3/0688* (2013.01)
(58) Field of Classification Search
CPC .... G06F 3/0631; G06F 3/0604; G06F 3/0616; G06F 3/0653; G06F 3/0665; G06F 3/0688
USPC ....................................................... 711/154
See application file for complete search history.

(56) References Cited

U.S. PATENT DOCUMENTS

| 5,893,139 | A | 4/1999 | Kamiyama | |
|---|---|---|---|---|
| 7,529,903 | B2 | 5/2009 | Boss et al. | |
| 9,361,217 | B2 | 6/2016 | Greenfield et al. | |
| 2015/0205714 | A1* | 7/2015 | Greenfield | G06F 3/0631 711/158 |
| 2019/0220212 | A1* | 7/2019 | Xu | G06F 11/1076 |
| 2020/0159411 | A1* | 5/2020 | Mukaida | G06F 3/0607 |
| 2020/0210089 | A1* | 7/2020 | Xu | G06F 3/0689 |
| 2020/0257592 | A1* | 8/2020 | Colgrove | G06F 3/064 |
| 2020/0257620 | A1* | 8/2020 | Longnos | G06F 3/064 |

FOREIGN PATENT DOCUMENTS

| JP | 5304950 B2 | 10/2013 |
|---|---|---|
| JP | 6274127 B2 | 2/2018 |

* cited by examiner

*Primary Examiner* — Than Nguyen
(74) *Attorney, Agent, or Firm* — Foley & Lardner LLP

(57) ABSTRACT

A memory system includes a plurality of physical memories and a memory controller. The memory controller is configured to configure one or more logical memories used by one or more programs, respectively, to which areas of the plurality of physical memories are allocated. The memory controller is configured to calculate first data indicating a response performance of the plurality of physical memories, calculate second data indicating a degree of influence of waiting for access to the one or more logical memories, the degree of influence being on a processing performance of the one or more programs, and control allocation of the areas of the plurality of physical memories to the one or more logical memories on the basis of the first data and the second data.

20 Claims, 14 Drawing Sheets

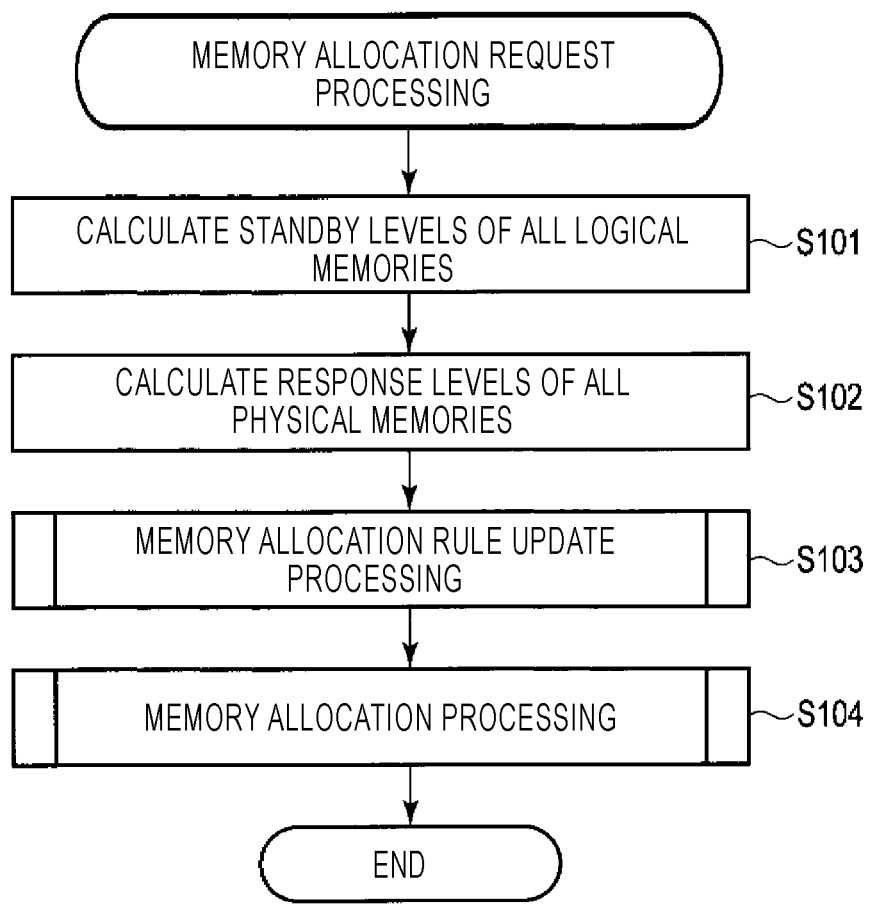

FIG. 4

RESPONSE LEVEL TABLE 43

| PHYSICAL MEMORY NUMBER | RESPONSE LEVEL |
|---|---|
| 1 | 503 |
| 2 | 46 |

FIG. 5

MEMORY ALLOCATION RULE TABLE 44

| LOGICAL MEMORY NUMBER | PHYSICAL MEMORY NUMBER |
|---|---|
| 1 | 1 |
| 2 | 2 |
| 3 | 1, 2 |

FIG. 6

MEMORY ALLOCATION CONDITION TABLE 45

| CONDITION NUMBER | LOGICAL MEMORY CONDITION | ALLOCATION TARGET PHYSICAL MEMORY CONDITION |
|---|---|---|
| 1 | STANDBY LEVEL IS 1 OR MORE AND LESS THAN 100 | RESPONSE LEVEL IS LOWEST |
| 2 | STANDBY LEVEL IS 100 OR MORE AND LESS THAN 1000 | RESPONSE LEVEL IS 30 OR MORE |
| 3 | STANDBY LEVEL IS 1000 OR MORE | RESPONSE LEVEL IS 100 OR MORE |

FIG. 9
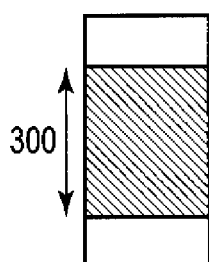
LOGICAL MEMORY [1]
300
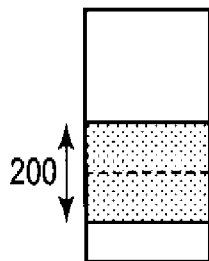
LOGICAL MEMORY [2]
200
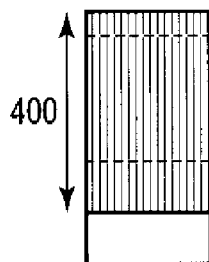
LOGICAL MEMORY [3]
400
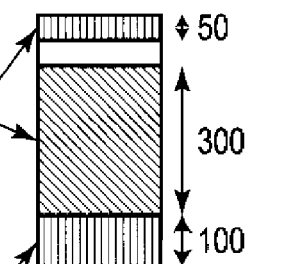
PHYSICAL MEMORY [1]
50
300
100
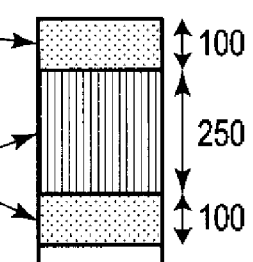
PHYSICAL MEMORY [2]
100
250
100

FIG. 10

MEMORY ALLOCATION MANAGEMENT TABLE 41

| LOGICAL MEMORY NUMBER | LOGICAL MEMORY OFFSET | PHYSICAL MEMORY NUMBER | PHYSICAL MEMORY OFFSET | SIZE |
|---|---|---|---|---|
| 1 | 100 | 1 | 100 | 300 |
| 2 | 250 | 2 | 0 | 100 |
| 2 | 350 | 2 | 350 | 100 |
| 3 | 0 | 1 | 0 | 50 |
| 3 | 50 | 2 | 100 | 250 |
| 3 | 300 | 1 | 400 | 100 |

UTILIZATION-EFFICIENT RESOURCE ALLOCATION

CROSS-REFERENCE TO RELATED APPLICATION(S)

This application is based upon and claims the benefit of priority to Japanese Patent Application No. 2020-031667, filed Feb. 27, 2020, the entire contents of which are incorporated herein by reference.

FIELD

Embodiments described herein relate generally to a memory system and a memory control method.

BACKGROUND

A memory system having a memory hierarchy implemented by combining different memories such as a high-speed/small capacity memory and a low-speed/large capacity memory is widely used. In the memory system having a memory hierarchy, the memory hierarchy is generally controlled on the basis of temporal/spatial locality of data or access frequency.

When a memory hierarchy is shared and used by a plurality of application programs, it is important to control the memory hierarchy in consideration of the degree of influence of memory access on each processing performance such that the utilization efficiency of memory resources constituting the memory hierarchy may be maximized.

DESCRIPTION OF THE DRAWINGS

FIG. 2 is a flowchart illustrating the flow of a memory allocation request processing executed by the memory system of the first embodiment when a memory allocation request is acquired.

FIG. 3 is a view illustrating an example of a waitlevel table used by the memory system of the first embodiment.

FIG. 4 is a view illustrating an example of a response level table used by the memory system of the first embodiment.

FIG. 5 is a view illustrating an example of a memory allocation rule table used by the memory system of the first embodiment.

FIG. 6 is a view illustrating an example of a memory allocation condition table used by the memory system of the first embodiment.

FIG. 9 is a view illustrating an example of memory allocation by the memory system of the first embodiment.

FIG. 10 is a view illustrating an example of a memory allocation management table used by the memory system of the first embodiment.

DETAILED DESCRIPTION

At least one embodiment provides a memory system and a memory control method in which the utilization efficiency of memory resources constituting a memory hierarchy may be improved.

In general, according to at least one embodiment, a memory system includes a plurality of physical memories, and a memory controller. The memory controller is configured to configure one or more logical memories used by one or more programs, respectively, to which areas of the plurality of physical memories are allocated. The memory controller is configured to calculate first data indicating response performance of the plurality of physical memories, calculate second data indicating a degree of influence of waiting for access to the one or more logical memories, the degree of influence being on processing performance of the one or more programs, and control allocation of the areas of the plurality of physical memories to the one or more logical memories on the basis of the first data and the second data.

Hereinafter, embodiments will be described with reference to drawings.

First Embodiment

First, a first embodiment will be described.

Figure 1:
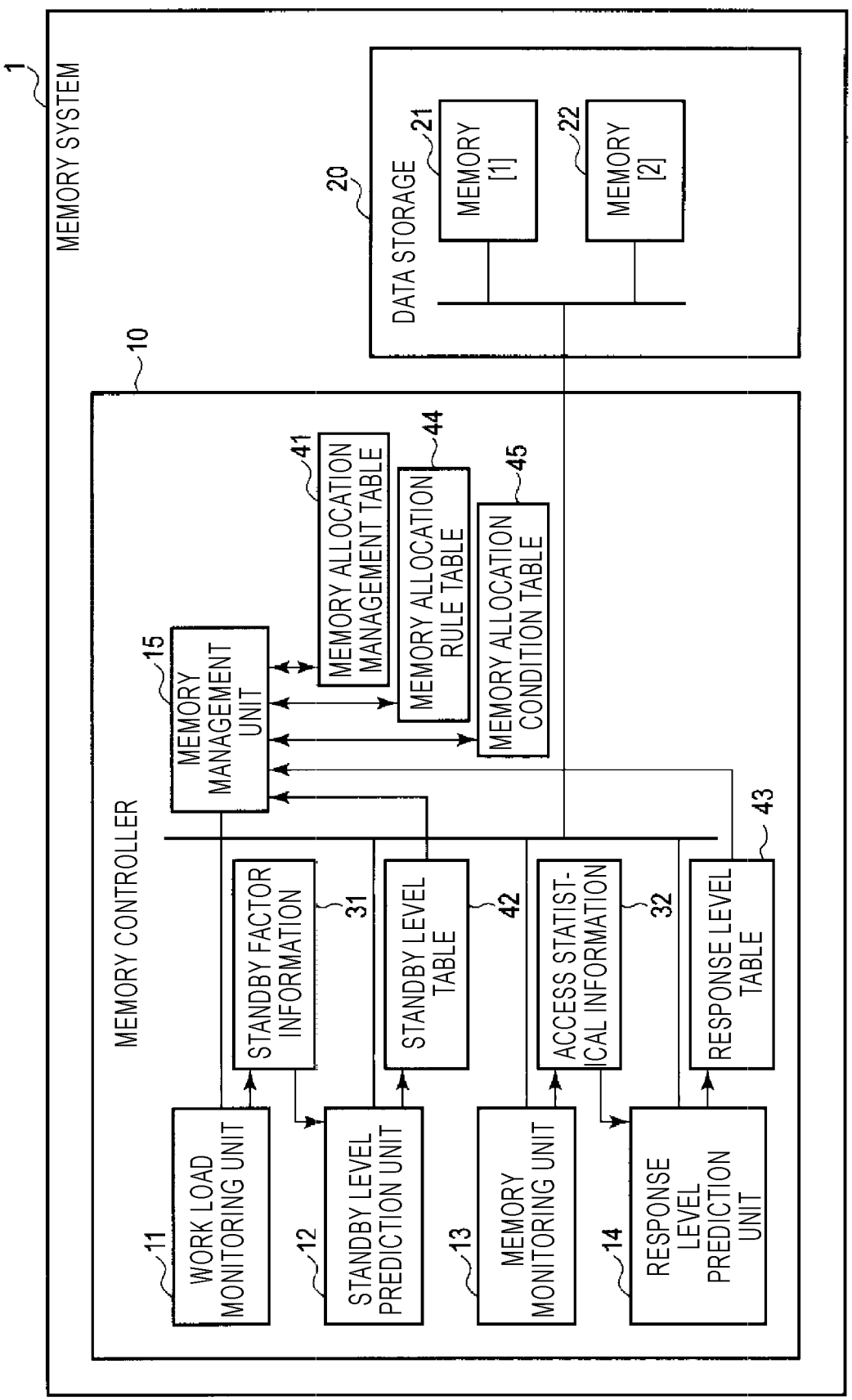
FIG. 1 is a block diagram illustrating a structural example of a memory system of a first embodiment.

FIG. 1 is a block diagram illustrating a structural example of a memory system 1 of at least one embodiment. The memory system 1 may be implemented as, for example, a computer system or a storage device.

As illustrated in FIG. 1, the memory system 1 includes a memory controller 10 and a data storage 20. The memory controller 10 includes a workload monitoring unit 11, a wait level prediction unit 12, a memory monitoring unit 13, a response level prediction unit 14, and a memory management unit 15, and is connected to the data storage 20. The data storage 20 includes a memory[1] 21 and a memory[2] 22, which are first and second physical memories having different characteristics, and is shared by a plurality of application programs. In the present memory system 1, a logical memory, which is a memory area exclusively usable by an application program, is implemented by combining one or more areas of the memory[1] 21 and the memory[2] 22 in the data storage 20. The logical memory may be implemented by only areas of either the memory[1] 21 or the memory[2] 22.

The logical memory is a logical memory area that may be referenced by users or application programs, and refers to a memory area for each process in a general operating system, a memory area for each virtual machine or container, a virtual storage volume, or an area of a memory or a storage managed by a namespace, but is not limited thereto. Meanwhile, when a certain logical memory is used as a persistent storage device, a memory such as a non-volatile memory or a battery-equipped memory, which does not lose data even when power supplied is interrupted, is used.

The physical memory is a physical memory resource that stores data, and a semiconductor storage memory represented by a volatile memory such as an SRAM or a DRAM, and a non-volatile memory such as a NAND flash memory, a phase change memory (PCM), a resistance change memory (ReRAM), or a magnetoresistive memory (MRAM), a hard disk drive (HDD), an optical disc such as a CD or a DVD, or a tape drive may be used.

For example, when the memory system 1 is implemented as a computer system, the logical memory may be configured as a cache-type memory hierarchy in which a cache memory inside a processor and a main memory are combined. For example, when the memory system 1 is implemented as a storage device, the logical memory may be configured as a tiered memory hierarchy in which a high-speed/small capacity storage medium and a low-speed/large capacity storage medium are combined. In the former case, the memory[1] 21 and the memory[2] 22 are, for example, a SRAM and a DRAM. In the latter case, the memory[1] 21 and the memory[2] 22 may be, for example, an SSD and an HDD. Physical memories having different characteristics are not necessarily different types of physical memories, but may be physical memories of the same product in which an individual difference may occur due to, for example, aging factors.

For example, when the memory system 1 is implemented as a computer system, the memory controller 10 may be established by a processor loading a program from an external storage to a main memory and executing the program. For example, when the memory system 1 is implemented as a storage device, the memory controller 10 may be a controller implemented by an SoC, which controls an SSD or an HDD, for example.

The workload monitoring unit 11 monitors a progress status of a processing in each application program that operates by exclusively using a logical memory, and collects wait factor information 31 of the application program. Here, the wait factor information 31 is information indicating a factor that suspends the processing of the application program, and reduces the utilization efficiency of a computer system. This corresponds to, for example, the number of wait cycles in a processor pipeline, the number of cache misses in a cache memory, or the number of context switches in an operating system. The wait factor information 31 may be collected by a performance counter of the computer system, or may be acquired as attribute information of a memory access request from each application program.

The wait level prediction unit 12 calculates await level indicating the degree of influence of waiting for access to a logical memory, on the processing performance of each application program, on the basis of the wait factor information 31 of each application program collected by the workload monitoring unit 11.

The memory monitoring unit 13 monitors an access status for each physical memory, and collects access statistical information 32 represented by the type of access to the physical memory (read, write, etc.), the number of accesses, and the access size. The access statistical information 32 may be collected by providing an access counter in the memory monitoring unit 13, or may be collected by providing an access counter in the memory[1] 21 or the memory[2] 22.

The response level prediction unit 14 calculates a response level indicating the access response performance of each physical memory, on the basis of the access statistical information 32 of each physical memory collected by the memory monitoring unit 13. For example, an average access response time is a representative example of the response level. A memory access pattern (random access or sequential access) may be extracted from the access statistical information 32, and the average access response time may be calculated according to the pattern.

The memory management unit 15 allocates a physical memory to a logical memory on the basis of a predetermined memory allocation rule. For example, a memory allocation rule may be considered in which a physical memory with a higher response level is allocated to a logical memory exclusively used by an application program in descending order of a wait level, but the present disclosure is not limited to such an arrangement and implementation. The memory management unit 15 has a memory allocation management table 41 that stores information of physical memories configuring logical memories, and updates the corresponding memory allocation management table 41 when allocating the physical memory. The memory allocation management table 41 is provided in, for example, a memory area dedicated to the memory controller 10 mounted in the memory system 1, as a work area of the memory controller 10. The information of physical memories configuring logical memories is information indicating a correspondence relationship between an area of a logical memory, and an area of a physical memory allocated to the area of the logical memory. The information stored in the memory allocation management table 41 is also used when an address of a logical memory is converted into an address of a physical memory. The memory allocation management table 41 is also referred to as a logical-to-physical address conversion table.

As for the timing when a physical memory is allocated to a logical memory, the time when an explicit allocation request is received from an application program, the time when a write request of new data is received from an application program, or the time when execution of an application program is started, may be considered, but the present disclosure is not limited thereto.

Next, descriptions will be made on details of the control of a memory hierarchy (a memory allocation method), which is executed by the memory system 1 configured as described above, according to at least one embodiment.

FIG. 2 is a flowchart illustrating the flow of a memory allocation request processing executed by the present memory system 1 when a memory allocation request is acquired.

When a memory allocation request for allocation of a physical memory to a certain logical memory is acquired, the memory controller 10 executes a memory allocation request processing of allocating the physical memory to the logical memory. As for the memory allocation request, one generated by an application program as necessary, or one generated by the memory controller 10 as an internal processing request when a data write request is acquired from an application program may be considered, but the present disclosure is not limited to such an implementation.

When the memory allocation request processing is started, the wait level prediction unit 12 calculates a wait level of each logical memory exclusively used by each application program, on the basis of the wait factor information 31 of each application program collected by the workload monitoring unit 11 (S101). For example, a wait level WaitLevel$_i$ of an application program$_i$, in a logical memory L$_i$, may be defined as $$WaitLevel_i = WaitCycleCount_i / CacheMissCount_i.$$

Here, WaitCycleCount$_i$, and CacheMissCount$_i$ indicate the number of wait cycles in a processor pipeline and the number of cache misses, respectively, which result from execution of the application program$_i$. By using this wait level, a logical memory exclusively used by an application program in which the number of wait cycles per cache miss is large may be estimated as having a high wait level (i.e., the degree of influence of memory access waiting on the processing performance of an application program is high). In a storage device using a non-volatile memory such as an SSD, the number of threads waiting for completion of access to a storage, or the number of context switches may be used for calculating the wait level. The wait level of a logical memory is synonymous with the wait level of an application program exclusively using the logical memory.

The calculation result of the wait level is stored in a wait level table 42 exemplified in FIG. 3. In a similar manner to the above described memory allocation management table 41, the wait level table 42 is provided in, for example, a memory area dedicated to the memory controller 10 mounted in the memory system 1, as a work area of the memory controller 10. In the wait level table 42 illustrated in FIG. 3, a logical memory 1 has a wait level of 2245, a logical memory 2 has a wait level of 34, and a logical memory 3 has a wait level of 894. Here, a wait level with a high numerical value is referred to as a high wait level, and it is assumed that the higher the numerical value of the wait level, the larger the influence of memory access delay on the application performance. Therefore, the wait level table 42 illustrated in FIG. 3 indicates that in the logical memory 1 with the highest wait level, the memory access delay has the largest influence on the application performance. In the logical memory 2 with the lowest wait level, the memory access delay has the smallest influence on the application performance.

Next, the response level prediction unit 14 calculates a response level of each physical memory, on the basis of the access statistical information 32 of each physical memory collected by the memory monitoring unit 13 (S102). For example, the memory monitoring unit 13 collects an access size (the size of data referenced by one access) and an access address (a memory location referenced by each access) in a series of access sequences for each physical memory. The response level prediction unit 14 predicts an access pattern from the access sizes and the access addresses in the access sequences collected by the memory monitoring unit 13. For example, the case where the access size is small, and a difference between addresses is large may be predicted as a random access. The case where the access size is large, and a difference between addresses is small, may be predicted as a sequential access. The response level ResponseLevel$_j$ of a physical memory may be defined as, for example, $$ResponseLevel_j = \alpha \times Throughput_j + \beta \times IOPS_j.$$

Here, Throughput$_j$ is a data transfer amount of the physical memory$_j$ per second, IOPS$_j$ is the number of accesses per second, and $\alpha$ and $\beta$ are constants. Here, $\alpha$ and $\beta$ are parameters indicating the weight factor for each of Throughput$_j$ and IOPS$_j$. When a random access is emphasized, by setting that $\beta > \alpha$, the weight of IOPS$_j$ may be increased, and conversely, when a sequential access is emphasized, by setting that $\alpha > \beta$, the weight of Throughput$_j$ may be increased. Throughput$_j$ and IOPS$_j$ may be observed by the memory monitoring unit 13, or may be observed inside the memory[1] 21 and the memory[2] 22, but the present disclosure is not limited thereto.

The calculation result of the response level is stored in a response level table 43 exemplified in FIG. 4. Like the above described memory allocation management table 41, the response level table 43 is provided in, for example, a memory area dedicated to the memory controller 10 mounted in the memory system 1, as a work area of the memory controller 10. In the response level table 43 illustrated in FIG. 4, a physical memory 1 has a wait level of 503, and a physical memory 2 has a response level of 46. Here, a response level with a high numerical value is referred to as a high response level, and it is assumed that the higher the numerical value of the response level, the higher the memory access response performance. Therefore, the response level table 43 illustrated in FIG. 4 indicates that in the physical memory 1 with the highest response level, the memory access response performance is highest, and in the physical memory 2 with the lowest response level, the memory access response performance is lowest.

After the wait level and the response level are calculated, the memory management unit 15 performs an update processing of a memory allocation rule (S103). The memory allocation rule is a rule that defines a physical memory allocatable to each logical memory on the basis of wait levels and response levels, and is stored in, for example, a memory allocation rule table 44 as illustrated in FIG. 5. In a similar fashion to the described memory allocation management table 41, the memory allocation rule table 44 is provided in, for example, a memory area dedicated to the memory controller 10 mounted in the memory system 1, as a work area of the memory controller 10. The memory allocation rule table 44 illustrated in FIG. 5 specifies that a physical memory allocatable to the logical memory 1 is the physical memory 1, a physical memory allocatable to the logical memory 2 is the physical memory 2, and a physical memory allocatable to the logical memory 3 is the physical memory 1 and the physical memory 2.

According to this memory allocation rule, a plurality of physical memories may be allocated to a certain logical memory like the logical memory 3. Here, priorities may be given to assigned physical memories, or alternate allocation may be performed by a round robin method, but the present disclosure is not limited thereto. At the allocation, when memory allocation cannot be performed due to the lack of a capacity of the physical memory defined by the memory allocation rule, or the failure, transition to an exception processing to be described below is performed.

The memory management unit 15 updates the memory allocation rule table 44 on the basis of wait levels and response levels acquired at the point in time of the memory allocation request processing, according to a memory allocation condition. The memory allocation condition defines a set including (i) the condition for classifying logical memories and (ii) the condition for specifying a physical memory to be allocated to a logical memory in each classified logical memory. An example of a memory allocation condition table 45 storing the memory allocation condition is illustrated in FIG. 6. Like the above described memory allocation management table 41, the memory allocation condition table is provided in, for example, a memory area dedicated to the memory controller 10 mounted in the memory system 1, as a work area of the memory controller 10.

A condition 1 indicates that among physical memories, a physical memory with the lowest response level is allocated to a logical memory with a wait level of 1 or more and less than 100. Likewise, a condition 2 indicates that a physical memory with a response level of 30 or more is allocated to a logical memory with a wait level of 100 or more and less than 1000. A condition 3 indicates that a physical memory with a response level of 100 or more is allocated to a logical memory with a wait level of 1000 or more.

Here, the conditions used in the memory allocation condition may be other conditions instead of the wait level or the response level. For example, as for the conditions that may be used as the memory allocation condition, a free space of a memory, a write amount, the number of read errors, or power consumption may be considered, but the present disclosure is not limited to such conditions.

Depending on the method of creating the memory allocation condition table 45, specifically, the method of providing a logical memory condition, it may happen that one certain logical memory satisfies logical memory conditions defined by a plurality of memory allocation conditions. That is, it may happen that one logical memory may belong to a plurality of categories. In this case, for example, only one condition may be adopted in ascending order of a condition number, or all found conditions may be adopted.

Here, for a certain logical memory, when none of memory allocation conditions stored in the memory allocation condition table 45 is satisfied, or when a physical memory as an allocation target that satisfies a condition defined by the memory allocation condition cannot be specified, an allocation error occurs. Thus, transition to a certain exception processing may be performed, or control may be performed to allocate a predefined default physical memory, but the present disclosure is not limited thereto.

Figure 7:
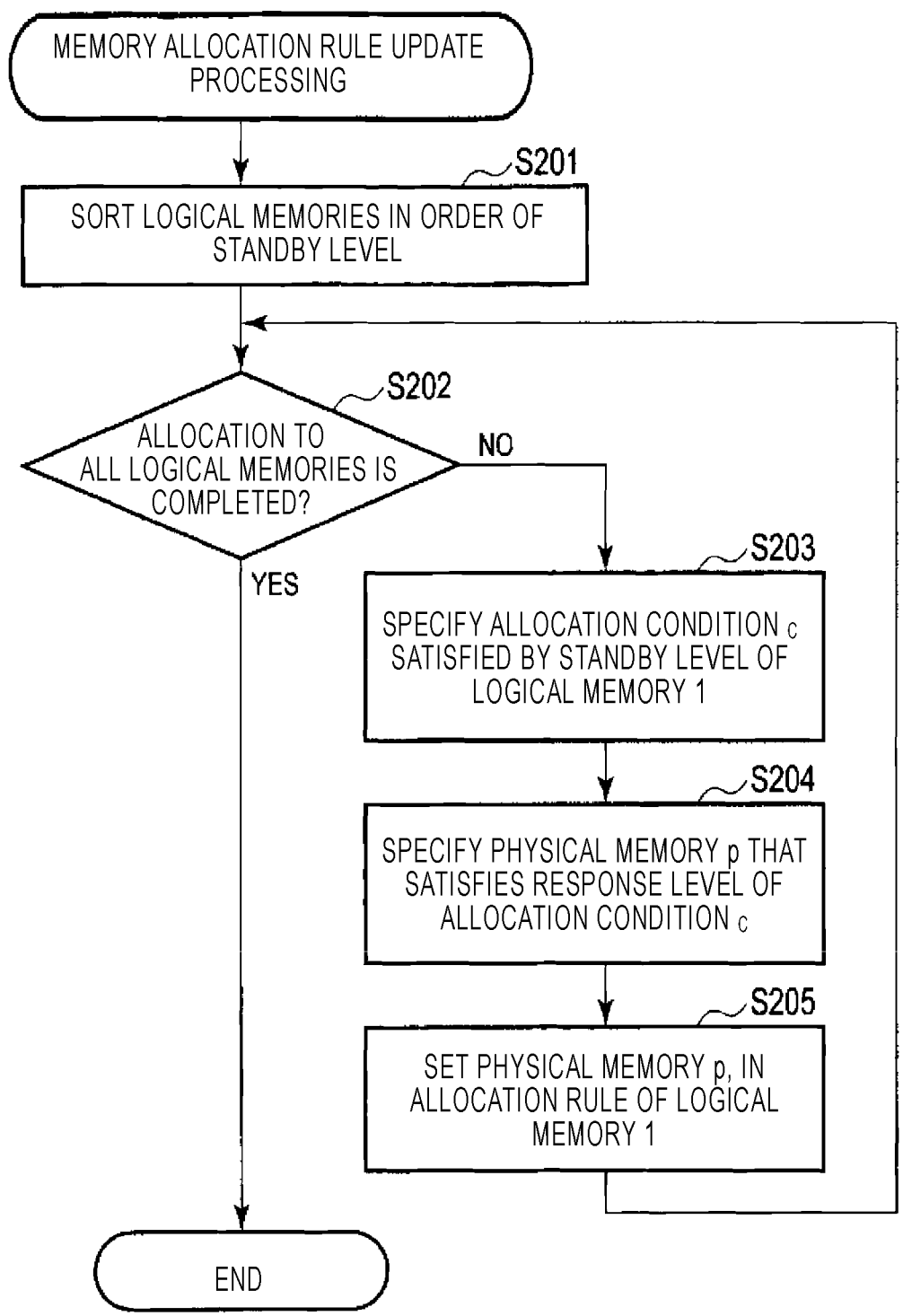
FIG. 7 is a flowchart illustrating the flow of memory allocation rule update processing in the memory allocation request processing executed by the memory system of the first embodiment.

FIG. 7 is a flowchart illustrating the flow of a memory allocation rule update processing in S103 of FIG. 2.

First, the memory management unit 15 sorts logical memories in order of the wait level (S201). This is to preferentially set physical memories by an allocation rule of logical memories in descending order of the wait level, but another ordering method may be used. Next, the memory management unit 15 allocates physical memories to all logical memories by referring to the memory allocation condition stored in the memory allocation condition table 45. That is, while there is a logical memory whose physical memory allocation is not completed (S202: NO), the memory management unit 15 executes processings in S203 to S205 to be described below.

First, the memory management unit 15 searches the memory allocation condition table 45, and specifies a memory allocation condition $_c$ satisfied by the wait level of the logical memory $_1$ (S203). Next, the memory management unit 15 specifies a physical memory $_p$ that satisfies the response level defined by the memory allocation condition $_c$ (S204). Finally, the memory management unit 15 sets the specified corresponding physical memory $_p$, in the memory allocation rule of the logical memory $_1$ (S205).

For example, in the case of the wait level table 42 illustrated in FIG. 3, and the memory allocation condition table 45 illustrated in FIG. 6, the wait level of the logical memory 3 is 894, and corresponds to the logical memory with await level of 100 or more and less than 1000, which is defined in the memory allocation condition 2. In the condition of an allocation target physical memory, a response level is 30 or more. In the case of the response level table 43 in FIG. 4, the physical memory with a response level of 30 or more corresponds to the physical memory 1 and the physical memory 2. Therefore, as in the memory allocation rule table 44 illustrated in FIG. 5, the memory management unit 15 registers the physical memory 1 and the physical memory 2 in the memory allocation rule of the logical memory 3.

The memory management unit 15 ends the memory allocation rule update processing when allocation of physical memories to all logical memories is completed (S202: YES). The memory management unit 15 that ends the memory allocation rule update processing executes a memory allocation processing (FIG. 2: S104).

Figure 8:
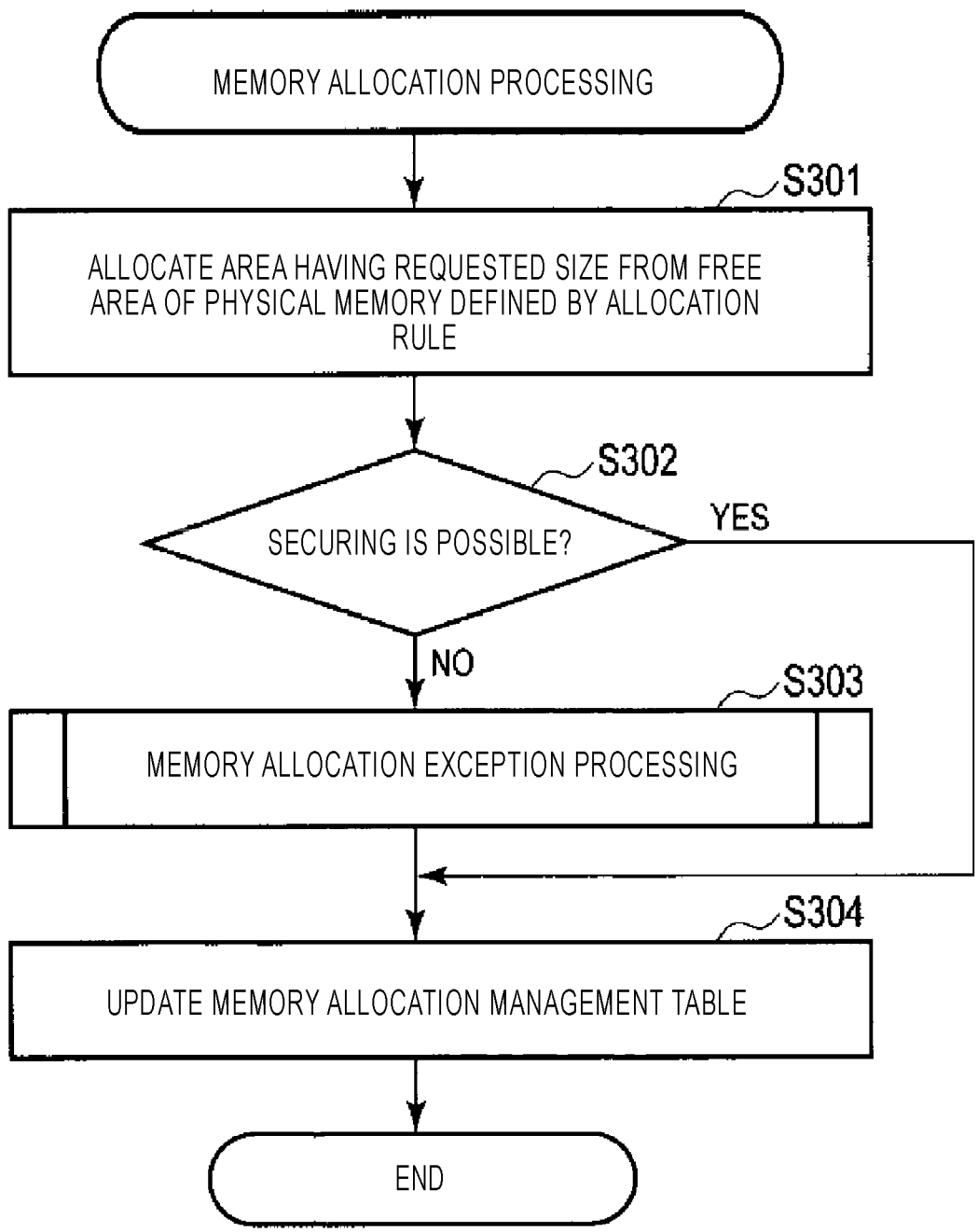
FIG. 8 is a flowchart illustrating the flow of memory allocation processing in the memory allocation request processing executed by the memory system of the first embodiment.

FIG. 8 is a flowchart illustrating the flow of a memory allocation processing in S104 of FIG. 2.

The memory management unit 15 allocates an area having a requested size from a free area of a physical memory as an allocation target defined by the memory allocation rule, for a logical memory as a request target (S301). The memory management unit 15 manages an allocation status of each physical memory, allocates an area having a size corresponding to the request, from the free area, and outputs information for specifying the area (S303). The allocated area may be a continuous area, or a collection of a plurality of fragmentary areas. For example, when the continuous area is allocated, a physical memory number and an offset from the head are output, and when the collection of the plurality of areas is allocated, a list in which physical memory numbers, offsets from the head, and area sizes are listed for the areas is output.

When an area having a requested size cannot be allocated (S302: NO), the memory management unit 15 performs a memory allocation exception processing (S303). For example, an interrupt such as a page fault in a virtual storage system is generated, and unnecessary data on the physical memory is deleted, or saved as a backup in another physical memory, so that a free area is increased. Then, the memory allocation processing is executed again.

An example of memory allocation by the memory management unit 15 is illustrated in FIG. 9. In the logical memory 1, for the memory allocation request for an area having a size of 300, in accordance with the memory allocation rule illustrated in FIG. 5, a continuous area of the physical memory 1 is allocated. In the logical memory 2, for the memory allocation request for an area having a size of 200, two areas (a total size of 200), that is, an area having a size of 100 from the offset 0 (head) of the physical memory 2, and similarly, an area having a size of 100 from the offset 350 (a position following an area having a size of 350 from the head) of the physical memory 2, are allocated. In the logical memory 3, for the memory allocation request for a size of 400, three areas (a total size of 400), that is, an area having a size of 50 from the offset 0 of the physical memory 1, an area having a size of 250 from the offset 100 of the physical memory 2, and an area having a size of 100 from the offset 400 of the physical memory 1, are allocated.

When completing the requested physical memory allocation, the memory management unit 15 updates the memory allocation management table 41 (S304). An example of the memory allocation management table is illustrated in FIG. 10. This example corresponds to a memory allocation example illustrated in FIG. 9.

In the memory allocation management table 41 illustrated in FIG. 10, a set including a physical memory number and a physical memory offset is described for a set including a logical memory number and a logical memory offset. The size is common to the logical memory and the physical memory. In general, when a size of an area to be managed is variable, a calculation amount or a memory amount required for management tends to increase. For this reason, in the memory allocation management table 41, information on allocation of a physical memory area to a logical memory area may be recorded for each fixed size.

As described above, in the memory system 1 of at least one embodiment, in an environment where application programs operate at the same time and share and use memory resources, the memory controller 10 may perform memory allocation in consideration of a wait level of each application program and a response level of each physical memory. This improves inefficiency caused by an execution wait state of the application program.

That is, according to the memory allocation method described herein, when logical memories (application programs) having different characteristics share physical memories having different characteristics, the present memory system 1 may preferentially allocate a physical memory with a high memory access response performance (response level) to a logical memory in which the degree of influence (wait level) by memory access delay is high. Accordingly, the present memory system 1, according to some embodiments, may maximize the utilization efficiency of memory resources. The memory system 1 of at least one embodiment is able to control the memory hierarchy according to a workload by performing memory allocation on the basis of wait levels and response levels monitored during operation of application programs.

Second Embodiment

Next, a second embodiment will be described.

Figure 11:
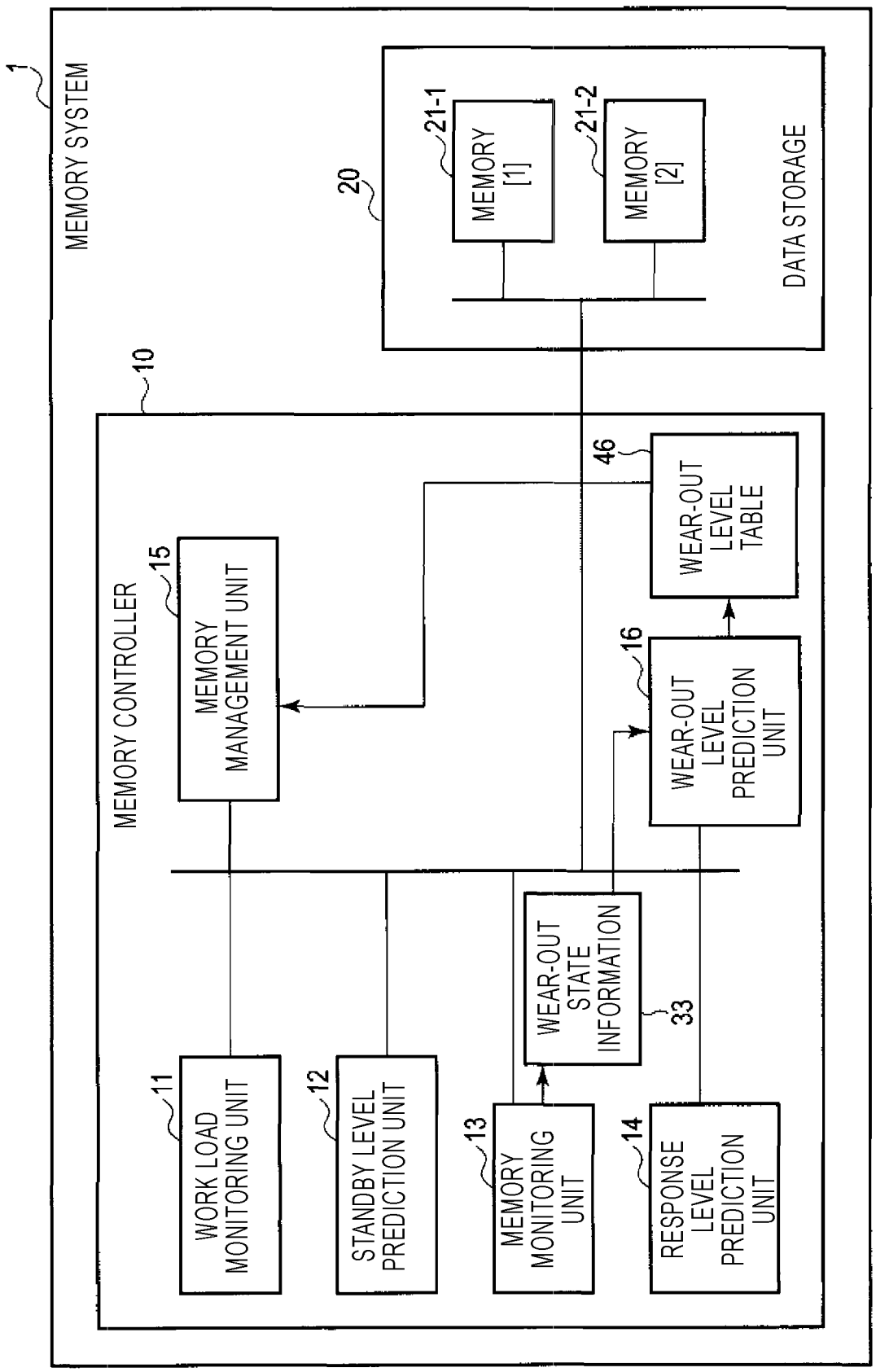
FIG. 11 is a block diagram illustrating a structural example of a memory system of a second embodiment.

FIG. 11 is a block diagram illustrating a configuration example of the memory system 1 of at least one embodiment. Similarly to the first embodiment, the memory system 1 of the second embodiment may also be implemented as, for example, a computer system or a storage device. Here, the same reference numerals are used for the same components as those in the memory system 1 of the first embodiment. Then, descriptions on the same portions as those in the memory system 1 of the first embodiment will be omitted, and only different portions will be described. As illustrated in FIG. 11, the configuration of the memory system 1 of at least one embodiment is different from that of the memory system 1 of the first embodiment, in that a wear level prediction unit 16 is further provided.

The memory monitoring unit 13 according to at least one embodiment collects wear state information 33 including a wear state for each physical memory, as well as the access statistical information 32 for each physical memory. A non-volatile memory represented by a NAND flash memory generally has a limitation in terms of reliability or performance assurance because a memory element is worn by an operation such as writing or erasing, which causes an increase of a bit error rate. As for the wear state information 33 according to the embodiment, for example, in the NAND flash memory, the number of times of program/erase (P/E cycle), a data retention period (data retention time) indicating a time until stored data is lost due to a time change, or an Uncorrectable Bit Error Rate is assumed, but the present disclosure is not limited thereto. The wear state information 33 may be generated by the memory monitoring unit 13 from an access status for a memory, or may be read by the memory monitoring unit 13 when each physical memory stores the wear state information 33 therein.

The wear level prediction unit 16 calculates a wear level indicating the degree of wear of each physical memory on the basis of the wear state information 33 collected by the memory monitoring unit 13. For example, the wear level WearLevel$_j$ of a certain physical memory$_j$ may be defined as $$\text{WearLevel}_j = \alpha \times \text{PECycle}_j + \beta \times \text{DataRetentionTime}_j.$$

Here, PECycle$_j$ is an average P/E cycle of the physical memory$_j$, DataRetentionTime$_j$ is an average data retention period of the physical memory$_j$, and $\alpha$ and $\beta$ are constants that control the degree of influence of each term. This definition may indicate that a physical memory having a larger average P/E cycle and a longer average data retention period has a higher wear level, and thus is placed in a wear state.

Figure 12:
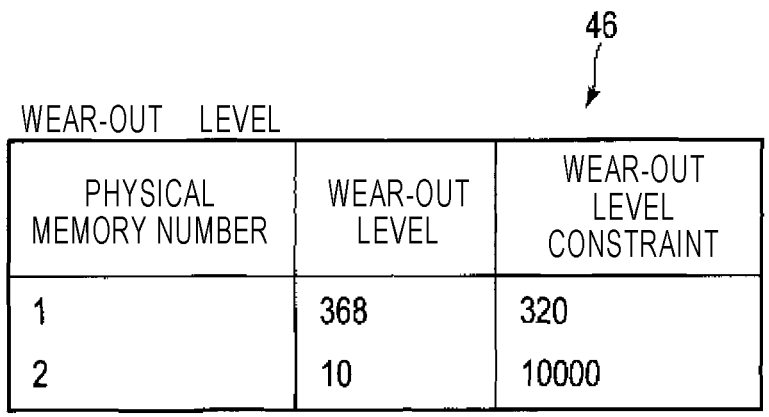
FIG. 12 is a view illustrating an example of a wear level table used by the memory system of the second embodiment.

The calculation result of the wear level is stored in a wear level table 46 exemplified in FIG. 12. Like the memory allocation management table 41 described in the first embodiment, the wear level table 46 is provided in, for example, a memory area dedicated to the memory controller 10 mounted in the memory system 1, as a work area of the memory controller 10. In the wear level table 46 illustrated in FIG. 12, the wear level of the physical memory 1 is 368, and the wear level of the physical memory 2 is 10. Here, it is assumed that the higher the numerical value of the wear level, the further the wearing progresses. Therefore, the wear level table 46 illustrated in FIG. 12 indicates that the physical memory 1 is in a more wear state.

As illustrated in FIG. 12, the wear level table 46 stores a wear level constraint for each physical memory, which is a constraint condition of a wear level. The wear level constraint may be set in advance from specifications of the physical memory, and may be used for, for example, control in excluding a physical memory with a wear level exceeding a wear level constraint, from a memory allocation target, or in reducing an allocation priority.

Figure 13:
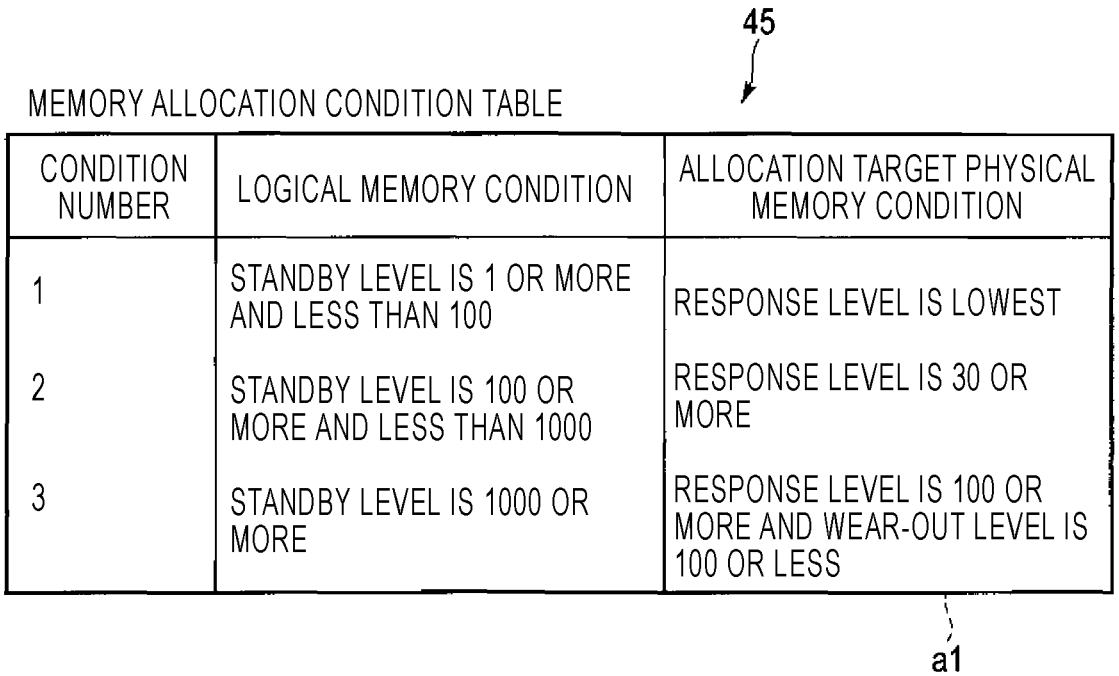
FIG. 13 is a view illustrating an example of a memory allocation condition table used by the memory system of the second embodiment.

Then, the memory management unit 15 in the embodiment controls allocation of physical memories to logical memories on the basis of a wear level as well as the wait level and the response level described in the first embodiment. The wear level may be used as a selection condition for a physical memory in a memory allocation condition, such as the response level. FIG. 13 illustrates an example of the memory allocation condition table 45 storing a memory allocation condition in which the wear level is used in an allocation target physical memory condition. In the memory allocation condition table 45 illustrated in FIG. 13, a portion indicated by the reference numeral a1 is added to the condition 3 of the memory allocation condition table 45 illustrated in FIG. 6 in the description of the first embodiment. In this manner, when a response level of 100 or more "and a wear level of 100 or less" are defined as an allocation target physical memory condition of the condition 3 and a high response level is requested, allocation of a physical memory with a high wear level may be prevented.

The wear level may also be output to the response level prediction unit 14, and used for calculating a response level. In general, in a non-volatile memory that is worn, an error correction processing time is increased due to an increase of a bit error rate, and thus a memory access response performance is reduced. Thus, reflecting a wear level in prediction of a response level may be considered. For example, when a wear level is taken into consideration, a response level ResponseLevel'$_j$ may be defined as ResponseLevel'$_j$=ResponseLevel$_j$/WearLevel$_j$. Since the higher the wear level of a physical memory, the lower the response level, the allocation of a physical memory that is worn may be prevented.

As described above, further, the memory system 1 of the embodiment may perform memory allocation in consideration of the wear state of a physical memory by a memory allocation method described here, and based on a wear level. In particular, while allocation of a physical memory that is worn may be prevented, memory allocation according to characteristics of a logical memory (an application program) may be performed. In general, in an SSD using a non-volatile memory, a technique called wear leveling is used to perform control/leveling of a write amount according to a wear state of a memory block. The memory allocation method described herein may be applied to a computer system or a storage system using an SSD so as to optimize memory allocation in consideration of a wear level.

In the memory system 1 of at least one embodiment, the memory monitoring unit 13 may collect the wear state information 33 such that instead of each physical memory, the wear state information 33 includes a wear state of each area having a predetermined size on a physical memory. In this case, optimization of memory allocation may be achieved in consideration of a wear level with a finer unit size.

Third Embodiment

Next, a third embodiment will be described.

In the description of the memory system 1 in the first embodiment or the second embodiment, an example is described in which the memory controller 10 performs a memory allocation processing when a memory allocation request is acquired. In the memory system 1 of the third embodiment, the memory controller 10 further allocates a physical memory again to a logical memory to which a physical memory is already allocated, and relocates data. Hereinafter, a description is made of a data relocation method in at least one embodiment.

The memory management unit 15 in at least one embodiment executes a data relocation processing when a specific condition is satisfied. As for the specific condition, for example, a case where a predetermined time passed after a certain logical memory was configured, or a case where there is no physical memory that satisfies a memory allocation condition for a certain logical memory (exception processing) may be considered.

Figure 14:
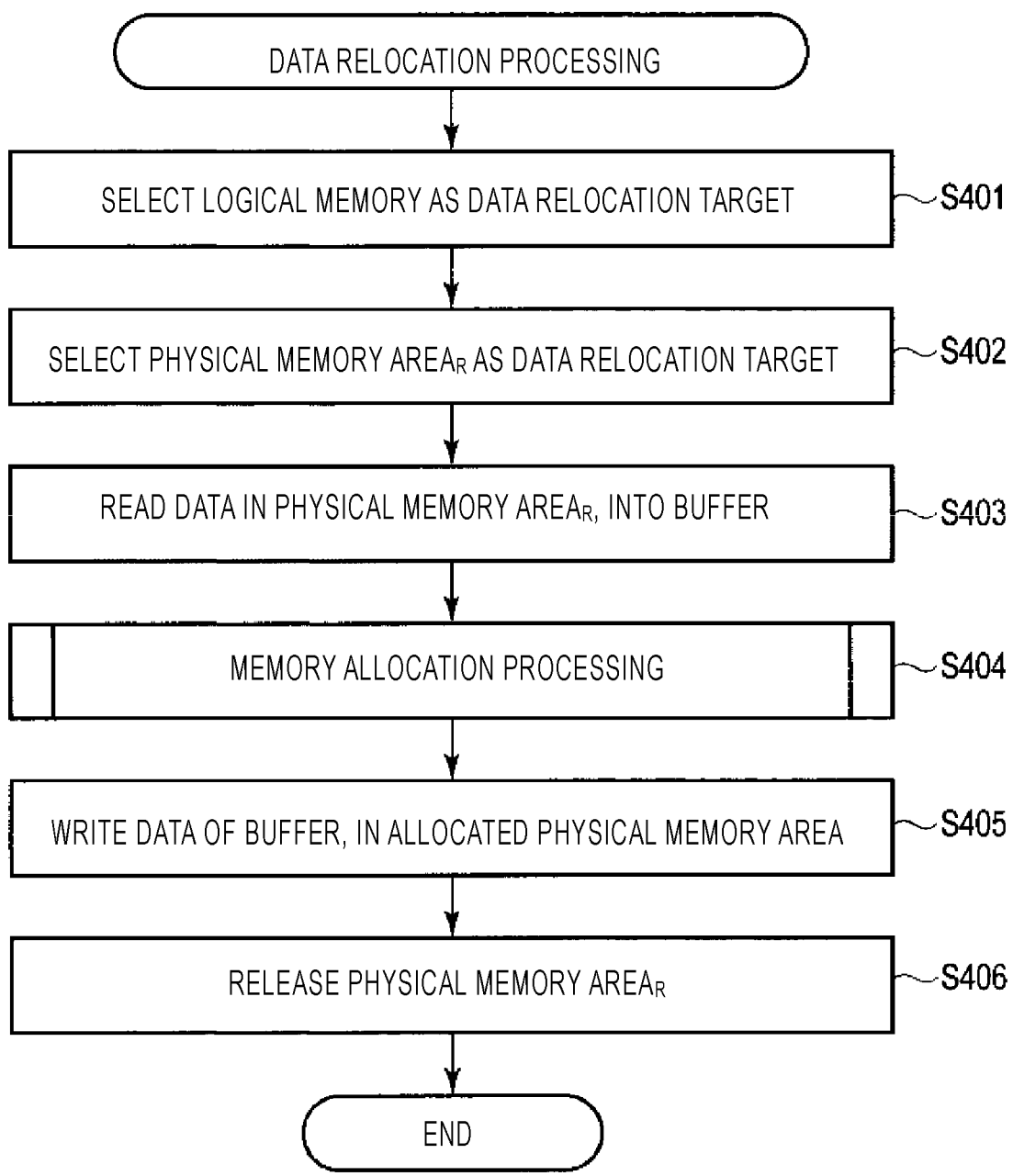
FIG. 14 is a flowchart illustrating the flow of data relocation processing executed by a memory system of a third embodiment.

FIG. 14 is a flowchart illustrating the flow of a data relocation processing executed by the present memory system 1.

First, the memory management unit 15 selects a logical memory for which data relocation is to be performed (S401). For example, at the point in time when a data relocation processing is executed, selecting a logical memory with the highest wait level, or a logical memory in which the elapsed time is longest after configuration may be considered.

Next, the memory management unit 15 selects a physical memory area$_R$ as a target of data relocation, among physical memory areas allocated to the selected logical memory (S402). As for the physical memory area$_R$, for example, among physical memory areas allocated to the target logical memory, selecting a memory area to which a physical memory different from that in the memory allocation rule (FIG. 5) is allocated at this point in time, with reference to the memory allocation management table (FIG. 10), may be considered.

Subsequently, the memory management unit 15 reads data in the selected physical memory area$_R$ into a buffer memory (S403). For the buffer memory, a specific memory area of the data storage 20 may be fixedly allocated and used, or the buffer memory may be provided in a memory area dedicated to the memory controller 10 mounted in the memory system 1, as a work area of the memory controller 10.

Next, the memory management unit 15 performs memory allocation processing (FIG. 8) described in the first embodiment in order to allocate a physical memory area having the same size as the physical memory area$_R$ instead of the physical memory area$_R$ selected in S402 (S404). Then, the memory management unit 15 writes the data in the buffer memory read in S403, in the physical memory area newly allocated in S404 (S405). When data writing is completed, the memory management unit 15 releases the physical memory area$_R$ (S406), and updates free information of the physical memory managed by itself.

As described in the first embodiment or the second embodiment, first, the memory system 1 of at least one embodiment preferentially allocates a physical memory with a high response level to a logical memory with a high wait level on the basis of wait levels and response levels. However, since a memory allocation rule is being properly updated according to execution of application programs, there is a possibility that a previously allocated physical memory is not allocated according to the latest memory allocation rule. According to the data relocation method described herein, the memory system 1 of the embodiment may further perform memory allocation and data relocation again, on data stored in a previously allocated memory area, according to the latest memory allocation rule, so that memory resources may be efficiently utilized.

In the example of the data relocation processing illustrated in FIG. 14, data relocation is performed for each area of a logical memory and a physical memory, but a plurality of areas of a logical memory and a physical memory may be collectively targeted in data relocation.

The data relocation method according to at least one embodiment may also be used when a physical memory that is a memory allocation target is added/deleted. For example, the data relocation method described herein may be applied when a storage device is added or when a storage device is deleted due to failure or replacement so that a logical memory may be reconfigured.

Hereinafter, descriptions will be made to application examples of the memory controller 10 in charge of memory control in which physical memories are allocated to logical memories in each memory system 1, as described in the first embodiment to the third embodiment.

Computer System Having Memory Controller 10

Figure 15:
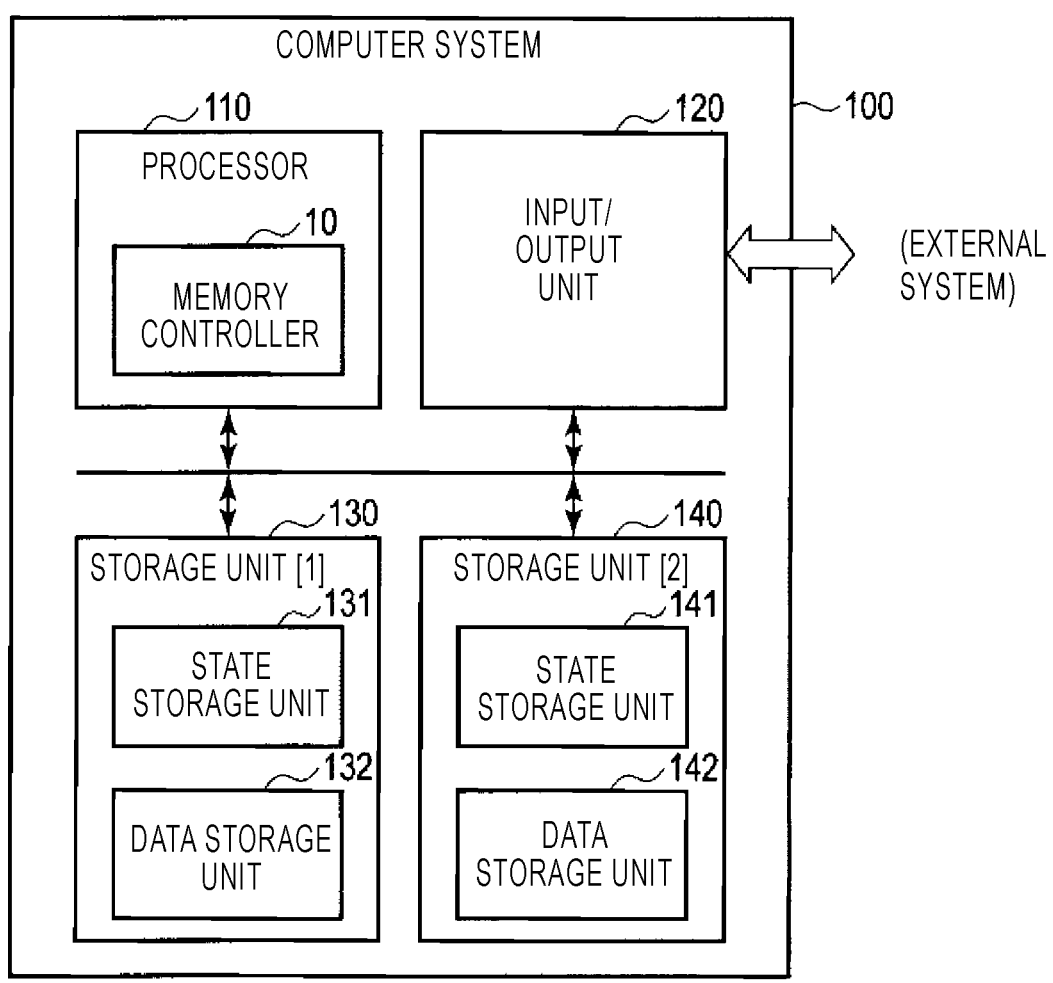
FIG. 15 is a view illustrating an example of a computer system having a memory controller that is a main component in the memory systems of the first embodiment to the third embodiment.

FIG. 15 is a view illustrating an example of a computer system 100 having the memory controller 10. The computer system 100 includes, for example, a processor 110, an input/output unit 120, a storage unit[1] 130, and a storage unit[2] 140 (first and second storage units), and these elements are connected to each other via a communication path such as a memory bus.

The processor 110 executes an application processing, and a CPU, a GPU, an FPGA, or a special purpose LSI may be considered, but the present disclosure is not limited thereto. The memory controller 10 herein may be implemented in the processor 110, but a processor dedicated to memory control may be provided.

The input/output unit 120 is an interface with various inputs/outputs or an external network, and controls data communication between the inside of the computer system and an external system.

The storage unit[1] 130 and the storage unit[2] 140 store data, and may be memory modules or storage devices such as a DIMM, an HDD, and an SSD, but the present disclosure is not limited thereto. The storage unit[1] 130 and the storage unit[2] 140 have state storage units 131 and 141 and data storage units 132 and 142. The state storage units 131 and 141 store access statistical information or wear state information of the data storage units 132 and 142, and are referenced by the memory controller 10. Each of the data storage units 132 and 142 has one or more memories for actually storing data. Here, the state storage units 131 and 141 corresponding to the data storage units 132 and 142 are provided, but the state storage units 131 and 141 may be individually provided for memories in the data storage units 132 and 142.

The memory controller 10 herein controls memories in the storage unit[1] 130 and the storage unit[2] 140, as physical memories, and performs memory allocation according to the memory allocation method described in any of the first embodiment to the third embodiment. Management data, such as the memory allocation management table 41, required for the memory allocation method may be stored in the storage unit[1] 130 and the storage unit[2] 140, or may be stored in a memory provided inside the processor 110, which is represented by a cache memory in the CPU. A logical memory implemented by the memory allocation method described in any of the first embodiment to the third embodiment, which is a main memory or a secondary memory (storage) in a general operating system, may be accessed from an application program.

In the computer system 100 having this structure and arrangement, when a large number of application programs are independently executed, or when a plurality of application programs provides a service through cooperation, it is possible to preferentially allocate a high-speed memory to an application program in which the degree of influence by memory access is high so that the utilization efficiency of limited memory resources may be maximized.

Storage Device Having Memory Controller 10

Figure 16:
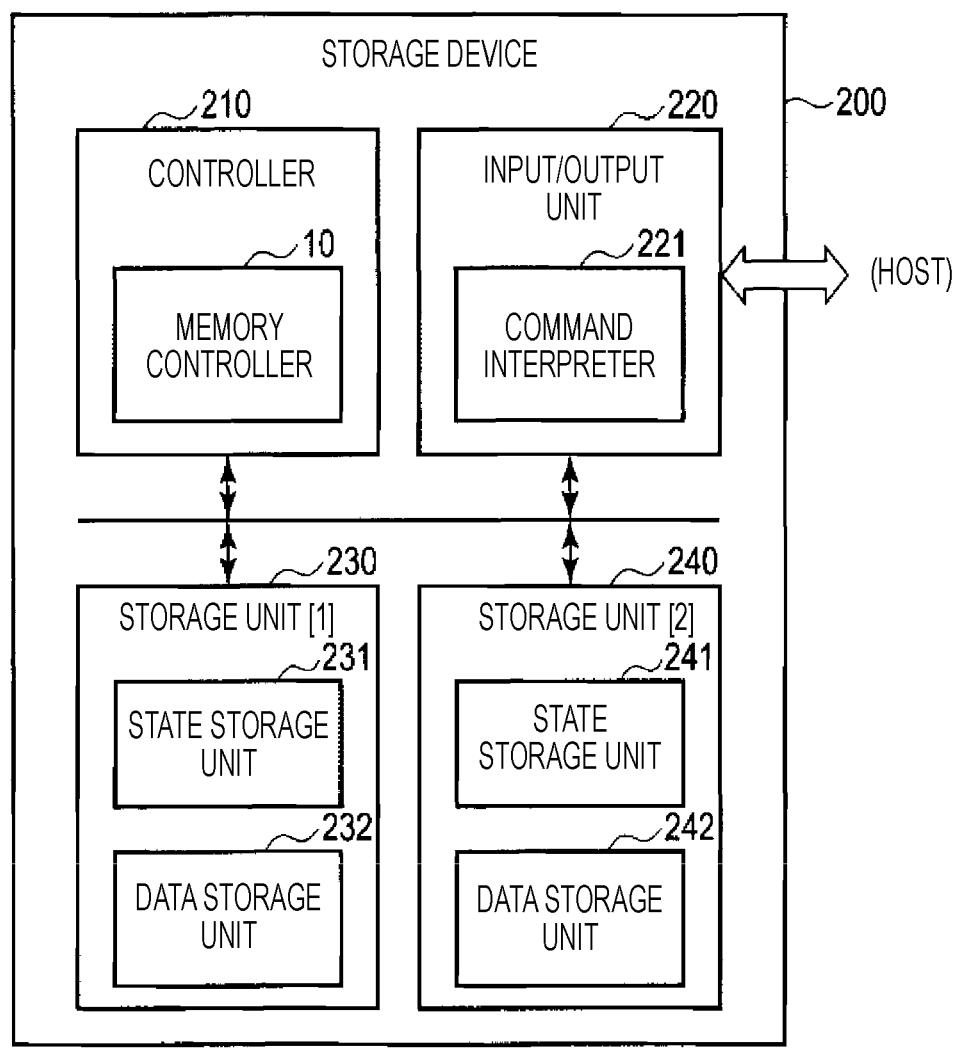
FIG. 16 is a view illustrating an example of a storage device having a memory controller that is a main component in the memory systems of the first embodiment to the third embodiment.

FIG. 16 is a view illustrating an example of a storage device 200 having the memory controller 10. The storage device 200 includes, for example, a controller 210, an input/output unit 220, a storage unit[1] 230, and a storage unit[2] 240, and these elements are connected to each other via a communication path such as a memory bus.

The controller 210 controls the entire storage device 200, and includes a CPU, a dedicated circuit, or a memory, but the present disclosure is not limited thereto. The memory controller 10 herein may be implemented in the controller 210, but a controller dedicated to memory control may be provided according to at least one embodiment.

The input/output unit 220 is an interface with an external device as a host of the storage device 200, and has a command interpreter 221 that interprets/responds to commands by which the host controls the storage device 200. In an SSD as a storage device using a non-volatile memory, command specifications defined by the SATA standard or the NVM Express (NVMe) (registered trademark) standard are generally used, but the present disclosure is not limited thereto. A communication standard such as PCI Express (PCIe) (registered trademark) or Ethernet (registered trademark) may be used for data communication with an external device in some embodiments, but the present disclosure is not limited thereto. Here, since an application program that accesses the storage device 200 is executed in an external device, a memory allocation request or the wait factor information 31 may be input from the external device via the input/output unit 220. In the calculation of a wait level in the wait level prediction unit 12, the wait factor information 31 input from the external device may be combined with information indicating the characteristics of an IO stream, which may be specified by the workload monitoring unit 11 within the memory controller 10.

The storage unit[1] 230 and the storage unit[2] 240 store data written by the host or management data managed by the controller 210, and may be packages of various memory chips, but the present disclosure is not limited thereto. The storage unit[1] and the storage unit[2] have state storage units 231 and 241 and data storage units 232 and 242. The state storage units 231 and 241 store the access statistical information 32 or the wear state information 33 of the data storage units 232 and 242, and are referenced by the memory controller 10. Each of the data storage units 232 and 242 has one or more memories for actually storing data. Here, the state storage units 231 and 241 corresponding to the data storage units 232 and 242 are provided, but the state storage units 231 and 241 may be individually provided for memories in the data storage units 232 and 242.

The memory controller 10 herein controls memories in the storage unit[1] 230 and the storage unit[2] 240, as physical memories, and performs memory allocation according to the memory allocation method described in any of the first embodiment to the third embodiment. Management data, such as the memory allocation management table 41, required for the memory allocation method may be stored in the storage unit[1] 230 and the storage unit[2] 240, or may be stored in a memory provided inside the controller 210, which is represented by a cache memory in the CPU. Further, a logical memory implemented by the memory allocation method described in any of the first embodiment to the third embodiment may be used in a namespace in an NVMe SSD, a logical volume, or a storage area of the memory allocation management table 41 (logical-to-physical address conversion table).

In the storage device 200 having this structure and arrangement, in a situation where a large number of namespaces or logical volumes are configured, and a large number of independent IO streams (request sequences) are input to the storage device 200, it is possible to preferentially allocate a high-speed memory to an IO stream in which the degree of influence by an access to the storage device 200 is high so that the utilization efficiency of limited memory resources may be maximized.

Figure 17:
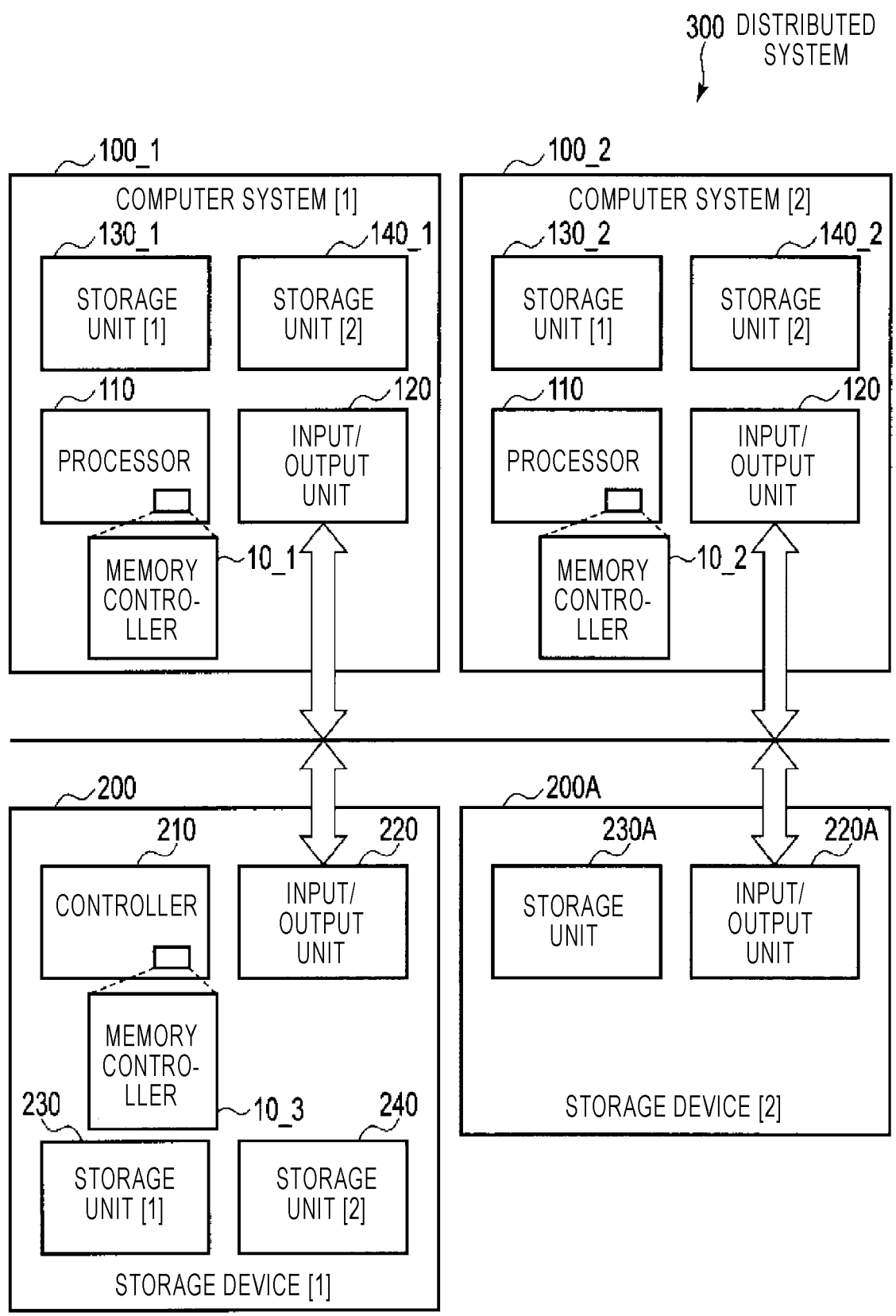
FIG. 17 is a view illustrating an example of a distributed system in which a computer system and a storage device each of which has a memory controller as a main component in the memory systems of the first embodiment to the third embodiment are connected to each other via a network.

Distributed System in which Computer System and Storage Device Having Memory Controllers 10 are Connected to Each Other Via a Network FIG. 17 is a view illustrating an example of a distributed system 300 in which the computer system 100 described with reference to FIG. 15, and the storage device 200 described with reference to FIG. 16, are connected to each other. More specifically, the distributed system 300 includes two computer systems 100_1 and 100_2 each of which has the memory controller 10, a storage device[1] 200 having the memory controller 10, and a storage device[2] 200A not having the memory controller 10, and these elements are connected to each other via a network. The storage device[2] 200A may be, for example, a storage device such as a general SSD. An input/output unit 220A of the storage device[2] 200A is an interface with an external device functioning as a host of the storage device 200A. A storage unit 230A of the storage device[2] 200A stores write data of the host, which is received by the input/output unit 220A. In the distributed system 300, application programs are executed in the processors 110 of the computer system[1] 100_1 and the computer system[2] 100_2.

A memory controller 10_1 of the computer system[1] 100_1 controls a storage unit[1] 130_1 and a storage unit[2] 140_1 in the computer system[1] 100_1 so as to provide a logical memory to an application program operating on the computer system[1] 100_1 or the computer system[2] 100_2. A memory controller 10_2 of the computer system[2] 100_2 controls a storage unit[1] 130_2 and a storage unit[2] 140_2 in the computer system[2] 100_2 so as to provide a logical memory to an application program operating on the computer system[2] 100_1 or the computer system[2] 100_2. A memory controller 10_3 of the storage device[1] 200 controls the storage unit[1] 230 and the storage unit[2] 240 in the storage device[1] 200 so as to configure a logical memory according to a request of an application program operating on the computer system[1] 100_1 or the computer system[1] 100_2.

In the distributed system 300 having this arrangement and structure, an amount of a memory that may be used as a logical memory is the sum of the capacity of the storage unit[1] 130_1 and the capacity of the storage unit[2] 140_1 under the control of the memory controller 10_1 of the computer system[1] 100_1, is the sum of the capacity of the storage unit[1] 130_2 and the capacity of the storage unit[2] 140_2 under the control of the memory controller 10_2 of the computer system[2] 100_2, and is the sum of the capacity of the storage unit[1] 230 and the capacity of the storage unit[2] 240 under the control of the memory controller 10_3 of the storage device[1] 200. As described above, the amount of a memory that may be used as a logical memory is limited to the capacity of a physical memory mounted in each device (the computer system[1] 100_1, the computer system[2] 100_2, and the storage device[1] 200), but the complexity of a memory allocation request processing may be reduced by performing memory allocation in each device.

Pattern for Controlling in Single Memory Controller 10 in Concentrated Manner

In the distributed system 300 configured as described above, a configuration may be made such that a particular memory controller 10 controls storage units within the distributed system 300. For example, in FIG. 17, the memory controller 10_1 of the computer system[1] 100_1 controls storage units of the computer system[1] 100_1, the computer system[2] 100_2, the storage device[1] 200, and the storage device[2] 200A so as to provide a logical memory to an application program executed on the distributed system 300. By employing this configuration, it is possible to configure a logical memory using physical memories in different devices. In this case, a memory allocation request processing is executed in the computer system[1] 100_1 in a unified manner, and is not executed in the computer system[2] 100_2 and the storage device[1] 200. Thus, in the computer system[2] 100_2 and the storage device[1] 200, a part or all of the functions of the memory controller 10 may be omitted. For example, the computer system[2] 100_2 outputs the calculation results of a wait level and a response level in the computer system[2] 100_2, to the computer system[1] 100_1, and in the memory controller 10 of the computer system[1] 100_1, the memory allocation request processing is executed.

Devices within the distributed system 300 are connected to each other via a network, and thus, when a device in which an application program is executed, and a device in which a physical memory is provided are different, a response level including a network delay is calculated. For example, an application program may be executed in the computer system[1] 100_1, and a logical memory may be implemented by using physical memories of the computer system[1] 100_1 and the computer system[2] 100_2. Here, in calculating the response level of the physical memory of the computer system[2] 100_2, the response level may be calculated by multiplying a response level reduction rate caused by a network delay, by the response level to be output from the computer system[2] 100_2.

When controlling is performed in this manner, the complexity of the memory allocation request processing is increased, but logical memories may be configured for all physical memories within the distributed system 300, as targets.

Pattern for Controlling in Plurality of Memory Controllers 10

Further, in the distributed system 300 configured as described above, for example, the structure and arrangement may be made such that the memory controller 10 of the computer system[1] 100_1 controls storage units of the computer system[1] 100_1 and the storage device[1] 200, and the memory controller 10 of the computer system[2] 100_2 controls storage units of the computer system[2] 100_2 and the storage device[2] 200A. In this case, the memory controller 10 of the computer system[1] 100_1 configures a logical memory by using physical memories in the computer system[1] 100_1 and the storage device[1] 200. Likewise, the memory controller 10 of the computer system[2] 100_2 configures a logical memory by using physical memories in the computer system[2] 100_2 and the storage device[2] 200A.

When controlling is performed in this manner, the memory allocation request processing may be performed in the plurality of memory controllers 10. Thus, the complexity required for memory allocation may be reduced, and logical memories may be configured for physical memories in a plurality of devices, as targets.

Storage System by Control Device not Having Storage Unit

Figure 18:
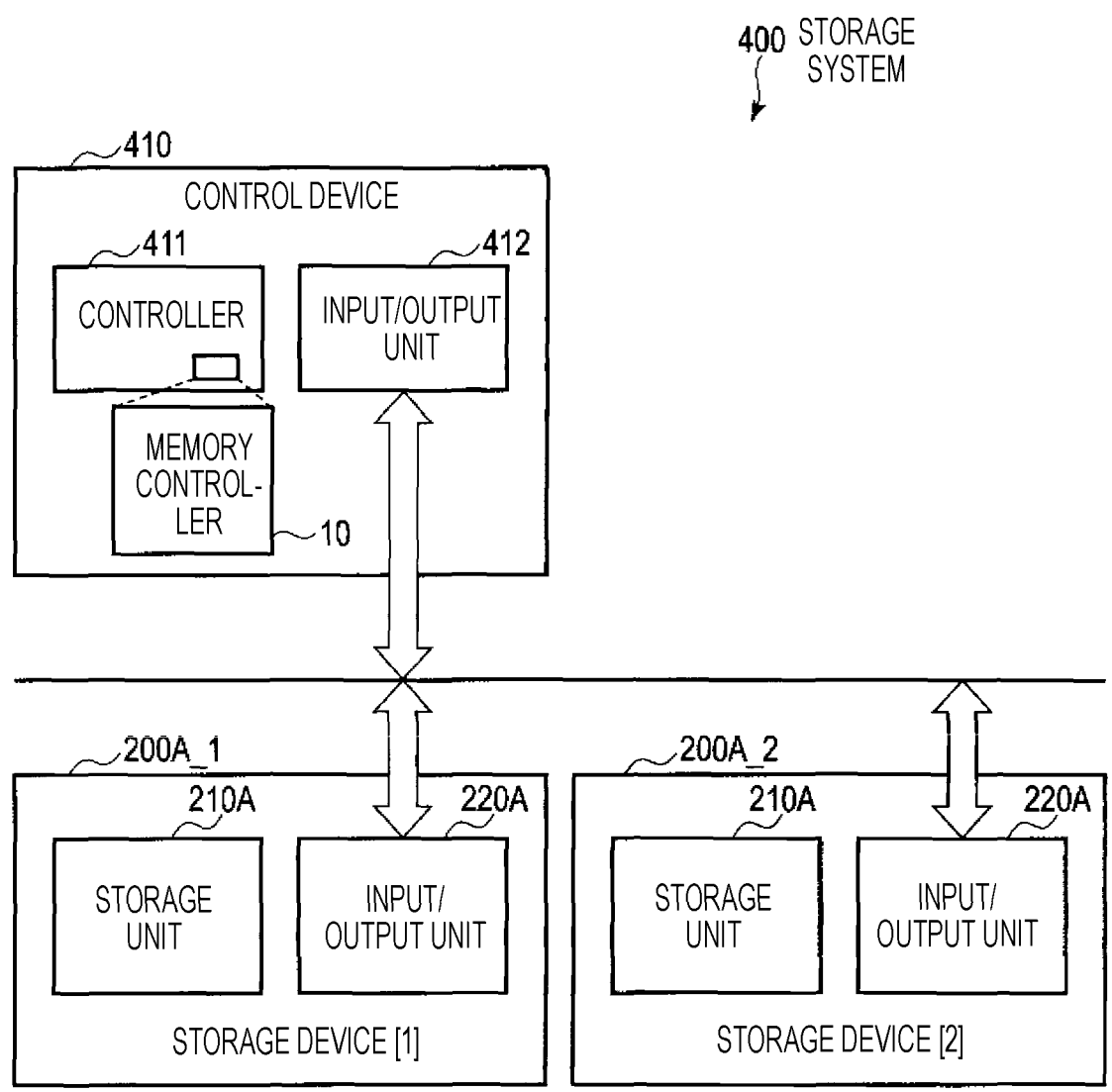
FIG. 18 is a view illustrating an example of a storage system by a control device that has a memory controller as a main component in the memory systems of the first embodiment to the third embodiment, and does not have a storage unit.

FIG. 18 is a view illustrating an example of a storage system 400 by a control device 410 not having a storage unit (having the memory controller 10). The storage system 400 includes the control device 410, a storage device[1] 200A_1 and a storage device[2] 200A_2, and these elements are connected to each other via a network. The control device 410 includes the memory controller 10, and executes a memory allocation request processing for storage units in the storage device[1] 200A_1 and the storage device[2] 200A_2, via an input/output unit 412. Each of the storage device[1] 200A_1 and the storage device[2] 200A_2 is a storage device having a storage unit implemented by one or more memories. In FIG. 18, the storage device[1] 200A_1, and the storage device[2] 200A_2 which do not have the memory controller 10 are exemplified, but one or both of the devices may be the storage device 200 having the memory controller 10 as illustrated in FIG. 16.

Since the storage system 400 does not have a processor, an application program may be executed in an external system in some embodiments. In the storage system 400, the application program issues a memory allocation request to the memory controller 10 in a controller 411 of the control device 410, so that a physical memory is allocated to a logical memory.

Through such a configuration, it is possible to configure a system in which the memory controller 10 and the storage unit are separated.

While certain embodiments have been described, these embodiments have been presented by way of example only, and are not intended to limit the scope of the disclosure. Indeed, the novel embodiments described herein may be embodied in a variety of other forms. Furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a plurality of physical memories; and
a memory controller configured to control one or more logical memories used by one or more programs, respectively, to which areas of the plurality of physical memories are allocated,
wherein the memory controller is configured to:
calculate first data indicating a response performance of the plurality of physical memories,
calculate second data indicating a degree of influence of waiting for access to the one or more logical memories, the degree of influence affecting a processing performance of the one or more programs, and
control allocation of the areas of the plurality of physical memories to the one or more logical memories on the basis of the first data and the second data,
wherein the memory controller is configured to calculate the first data by calculating a response level of each of the plurality of physical memories based on respective collected memory access statistical information of the physical memories.

2. The memory system according to claim 1, wherein the memory controller is configured to control the allocation of the areas of the plurality of physical memories to the one or more logical memories, by using a memory allocation condition that defines a set of a first condition and a second condition, wherein the first condition being a condition for classifying the one or more logical memories, the first condition indicating a range of a value of the second data, the second condition being a condition for specifying a physical memory among the plurality of physical memories to be allocated to a logical memory in each category by the first condition, the second condition indicating a range of a value of the first data.

3. The memory system according to claim 2, wherein in the memory allocation condition, the set of the first condition and the second condition is defined such that a physical memory, for which a value in a predetermined range is calculated as the first data, is allocated to a logical memory for which a value in a predetermined range is calculated as the second data.

4. The memory system according to claim 1, wherein the memory controller is configured to allocate a physical memory, for which a value in a predetermined range is calculated as the first data, to a logical memory, for which a value in a predetermined range is calculated as the second data.

5. The memory system according to claim 1, wherein the memory controller is configured to calculate third data indicating a degree of wear of each of the plurality of physical memories or each of areas having a predetermined size on the plurality of physical memories, and to control the allocation of the areas of the plurality of physical memories to the one or more logical memories on the basis of the third data.

6. The memory system according to claim 5, wherein the memory controller is configured to:
store a threshold indicating the degree of wear, at which the allocation of the areas to the one or more logical memories is prevented, for each of the plurality of physical memories, or each of the areas having the predetermined size on the plurality of physical memories, and
prevent allocation of the corresponding physical memory or the area having the predetermined size to the one or more logical memories, when in any physical memory among the plurality of physical memories or an area having the predetermined size, a value indicating a wear state exceeding the degree indicated by the threshold is calculated as the third data.

7. The memory system according to claim 1, wherein the memory controller is configured to calculate third data indicating a degree of wear of each of the plurality of physical memories or each of areas having a predetermined size on the plurality of physical memories, and to calculate the first data of the plurality of physical memories by using the third data.

8. The memory system according to claim 1, wherein the memory controller is configured to:
select a logical memory for which the allocation of the areas of the plurality of physical memories is reviewed, among the one or more logical memories, and
re-execute the allocation of the plurality of physical memories to the selected logical memory.

9. The memory system according to claim 8, wherein the memory controller is configured to select a logical memory, in which a value indicating the degree of influence, which is calculated as the second data, indicates a state having a highest degree of influence among the one or more logical memories, as the logical memory for which the allocation of the areas of the plurality of physical memories is reviewed among the one or more logical memories.

10. The memory system according to claim 8, wherein the memory controller is configured to select, among the one or more logical memories, a logical memory in which an elapsed time is longest after the allocation of the areas of the plurality of physical memories is performed as the logical memory for which the allocation of the areas of the plurality of physical memories is reviewed among the one or more logical memories.

11. The memory system according to claim 1, wherein the memory controller is configured to collect memory access statistical information, including a memory access size and a memory access address, relating to a series of access sequences for each of the physical memories.

12. The memory system according to claim 11, wherein memory controller is configured to predict an access pattern based on the memory access size and the memory access address.

13. A memory control method of a memory system that configures one or more logical memories used by one or more programs, respectively, to which areas of a plurality of physical memories are allocated, the method comprising:
calculating first data indicating a response performance of the plurality of physical memories;
calculating second data indicating a degree of influence of waiting for access to the one or more logical memories, the degree of influence affecting a processing performance of the one or more programs; and
controlling allocation of the areas of the plurality of physical memories to the one or more logical memories on the basis of the first data and the second data,
wherein the calculating the first data comprises calculating a response level of each of the plurality of physical memories based on respective collected memory access statistical information of the physical memories.

14. The method according to claim 13, wherein the controlling the allocation comprises controlling the allocation of the areas of the plurality of physical memories to the one or more logical memories, by using a memory allocation condition that defines a set of a first condition and a second condition,
wherein the first condition is a condition for classifying the one or more logical memories, the first condition indicating a range of a value of the second data, and
wherein the second condition is a condition for specifying a physical memory among the plurality of physical memories to be allocated to a logical memory in each category by the first condition, the second condition indicating a range of a value of the first data.

15. The method according to claim 14, wherein in the memory allocation condition, the set of the first condition and the second condition is defined such that a physical memory, for which a value in a predetermined range is calculated as the first data, is allocated to a logical memory for which a value in a predetermined range is calculated as the second data.

16. The method according to claim 13, wherein the controlling the allocation comprises allocating a physical memory, for which a value in a predetermined range is calculated as the first data, to a logical memory, for which a value in a predetermined range is calculated as the second data.

17. The method according to claim 13, further comprising
calculating third data indicating a degree of wear of each of the plurality of physical memories or each of areas having a predetermined size on the plurality of physical memories, and
controlling the allocation of the areas of the plurality of physical memories to the one or more logical memories on the basis of the third data.

18. The method according to claim 13, further comprising:
calculating third data indicating a degree of wear of each of the plurality of physical memories or each of areas having a predetermined size on the plurality of physical memories, and
calculating the first data of the plurality of physical memories by using the third data.

19. The method according to claim 13, further comprising:
selecting a logical memory for which the allocation of the areas of the plurality of physical memories is reviewed, among the one or more logical memories, and
re-executing the allocation of the plurality of physical memories to the selected logical memory.

20. The method according to claim 19, wherein the selecting comprises selecting, as the logical memory for which the allocation of the areas of the plurality of physical memories is reviewed among the one or more logical memories, a logical memory, for which a value indicating the degree of influence indicates a state having a highest degree of influence among the one or more logical memories, the value being calculated as the second data.

* * * * *